US010025232B2

(12) United States Patent
Sakamoto et al.

(10) Patent No.: US 10,025,232 B2
(45) **Date of Patent: *Jul. 17, 2018**

(54) INTERMEDIATE TRANSFER MEMBER FOR ELECTROPHOTOGRAPHY AND ELECTROPHOTOGRAPHIC APPARATUS

(71) Applicant: CANON KABUSHIKI KAISHA, Tokyo (JP)

(72) Inventors: Rieko Sakamoto, Kawasaki (JP); Kenji Onuma, Machida (JP); Naoto Kameyama, Kawasaki (JP); Kimihiro Yoshimura, Yokohama (JP); Akira Watanabe, Yokohama (JP); Koichi Sato, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 649 days.

This patent is subject to a terminal disclaimer.

(21) Appl. No.: 14/312,480

(22) Filed: Jun. 23, 2014

(65) Prior Publication Data

US 2014/0377564 A1 Dec. 25, 2014

(30) Foreign Application Priority Data

Jun. 25, 2013 (JP) ................................ 2013-133199

(51) Int. Cl.
*B32B 9/04* (2006.01)
*G03G 15/16* (2006.01)

(52) U.S. Cl.
CPC .... *G03G 15/162* (2013.01); *Y10T 428/31504* (2015.04)

(58) Field of Classification Search
None
See application file for complete search history.

(56) References Cited

U.S. PATENT DOCUMENTS 9,250,546 B2 * 2/2016 Kameyama ........ G03G 5/14726
9,720,353 B2 * 8/2017 Sakamoto ............ G03G 15/162
(Continued)

FOREIGN PATENT DOCUMENTS

JP 2009-192901 A 8/2009
WO WO 2013151182 A1 * 10/2013 ........... G03G 15/162

*Primary Examiner* — Callie Shosho
*Assistant Examiner* — Patrick English
(74) *Attorney, Agent, or Firm* — Canon U.S.A. Inc., IP Division

(57) ABSTRACT

An intermediate transfer member for electrophotography comprising a substrate and a surface layer provided on the substrate. The surface layer comprises a binder resin and a perfluoropolyether. An extraction amount of the perfluoropolyether per 10 $mm^3$ of the surface layer, is 0.10 mg to 5.00 mg, the extraction amount of the perfluoropolyether obtained by immersing the intermediate transfer member into a solvent that can dissolve the perfluoropolyether at 25° C. for 24 hours. A surface of the intermediate transfer member that is not subjected to first and second treatments, has a n-hexadecane contact angle of 55° or more. A surface of the intermediate transfer member that has been subjected to the first treatment, has a n-hexadecane contact angle of 40° or less. A surface of the intermediate transfer member that has been subjected to the second treatment, has a n-hexadecane contact angle of 50° or more.

10 Claims, 1 Drawing Sheet

(56) References Cited

U.S. PATENT DOCUMENTS

| | | | | |
|---|---|---|---|---|
| 2013/0149540 | A1* | 6/2013 | Sato | G03G 15/162 428/411.1 |
| 2015/0129496 | A1* | 5/2015 | Sanguineti | B01D 69/12 210/640 |

* cited by examiner

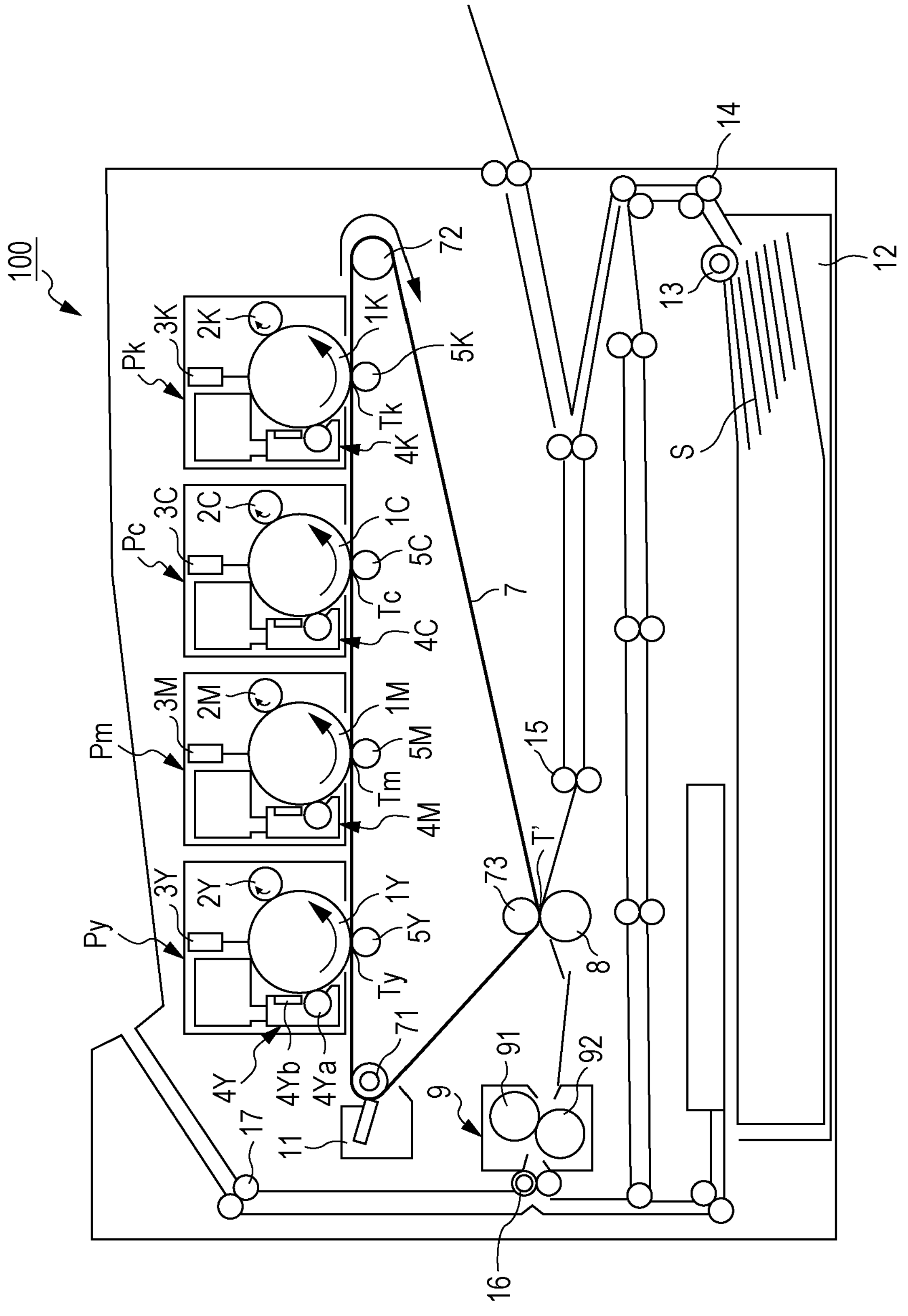
100
Py
Pm
Pc
Pk
1Y
2Y
3Y
4Y
4Ya
4Yb
5Y
Ty
1M
2M
3M
4M
5M
Tm
1C
2C
3C
4C
5C
Tc
1K
2K
3K
4K
5K
Tk
7
71
72
73
T'
8
9
91
92
11
12
13
14
15
16
17
S

INTERMEDIATE TRANSFER MEMBER FOR ELECTROPHOTOGRAPHY AND ELECTROPHOTOGRAPHIC APPARATUS

BACKGROUND OF THE INVENTION

Field of the Invention

The present invention relates to an intermediate transfer member for electrophotography for use in electrophotographic image-forming apparatuses, such as copying machines and printers, and an electrophotographic apparatus including the intermediate transfer member for electrophotography.

Description of the Related Art

Electrophotographic image-forming apparatuses (hereinafter also referred to as "electrophotographic apparatuses"), such as copying machines and printers, that can produce high-quality color images are commercially available.

Color images can be formed on recording media, such as paper sheets, using the following method.

First, an electrostatic latent image on each photosensitive member is developed color by color. A developed toner image of each color is successively transferred to an intermediate transfer member and forms a color toner image on the intermediate transfer member. The color toner image on the intermediate transfer member is transferred to a recording medium. Thus, the recording medium having the color toner image thereon is produced.

The intermediate transfer member is generally a semiconductive belt. A typical intermediate transfer member is formed of a resin, such as a polyimide or polyamideimide, and carbon black dispersed in the resin.

Intermediate transfer members are being variously improved to increase their functionality.

For example, in an intermediate transfer member proposed in Japanese Patent Laid-Open No. 2009-192901, a water-repellent and oil-repellent fluorine compound is applied to a surface of the intermediate transfer member to increase transfer efficiency.

During repeated transfer in printing, however, electrical discharge may occur before or after a contact between a photosensitive member or a recording medium and an intermediate transfer member. The electrical discharge causes toner on the intermediate transfer member to be scattered or impairs transferability, thus resulting in poor toner images.

SUMMARY OF THE INVENTION

The present invention is directed to providing an intermediate transfer member for electrophotography that can prevent image defects due to electrical discharge during repeated transfer and produce high-quality images for a long time. The present invention is also directed to providing an electrophotographic apparatus including the intermediate transfer member for electrophotography.

According to one aspect of the present invention, there is provided an intermediate transfer member for electrophotography comprising a substrate and a surface layer provided on the substrate. The surface layer comprises a binder resin and a perfluoropolyether. An extraction amount of the perfluoropolyether per 10 $mm^3$ of the surface layer, is 0.10 mg or more and 5.00 mg or less, the extraction amount of the perfluoropolyether obtained by immersing the intermediate transfer member for electrophotography into a solvent of 1,1,2,2,3,3,4-heptafluorocyclopentane and methylethylketone, the mixing ratio in mass being 1:1, at 25 degrees in Celsius for 24 hours. A surface of the intermediate transfer member for electrophotography that is not subjected to the following first and second treatments, has a n-hexadecane contact angle of 55 degrees or more. A surface of the intermediate transfer member for electrophotography that has been subjected to the following first treatment, has a n-hexadecane contact angle of 40 degrees or less. A surface of the intermediate transfer member for electrophotography that has been subjected to the following second treatment, has a n-hexadecane contact angle of 50 degrees or more.

(I) The first treatment includes the steps of:

(i) cutting a rectangular test piece from the intermediate transfer member for electrophotography;

(ii) wrapping and fixing the rectangular test piece around a peripheral surface of a cylindrical metal core to form a first roller;

(iii) bringing the first roller into contact with a second roller with a load of 2 kgf, the second roller including a cylindrical metal core and a surface layer provided thereon containing a carbon black and an acrylonitrile rubber, and having a volume resistivity of $1.0\times10^6\Omega\cdot cm$; and (iv) rotating the first roller at a circumferential speed of 200 mm/s for 15 hours while a voltage of 6.5 kV is applied between the first roller and the second roller.

(II) The second treatment includes the steps of:

(v) cutting a rectangular test piece from the intermediate transfer member for electrophotography;

(vi) wrapping and fixing the rectangular test piece around a peripheral surface of a cylindrical metal core to form a first roller;

(vii) bringing the first roller into contact with a second roller with a load of 2 kgf, the second roller comprising a cylindrical metal core and a surface layer provided thereon containing a carbon black and an acrylonitrile rubber, and having a volume resistivity of $1.0\times10^6\Omega\cdot cm$;

(viii) rotating the first roller at a circumferential speed of 200 mm/s for 15 hours while a voltage of 6.5 kV is applied between the first roller and the second roller; and (ix) heating the first roller resulting from the step (viii) at 70 degrees in Celsius for 2 hours.

According to another aspect of the present invention, there is provided an electrophotographic apparatus comprising the intermediate transfer member for electrophotography.

Further features of the present invention will become apparent from the following description of exemplary embodiments with reference to the attached drawing.

BRIEF DESCRIPTION OF THE DRAWINGS

FIGURE is a schematic view of an electrophotographic apparatus according to an embodiment of the present invention.

DESCRIPTION OF THE EMBODIMENTS

Intermediate Transfer Member for Electrophotography

An intermediate transfer member for electrophotography (hereinafter also referred to simply as an intermediate transfer member) according to the present invention will be described below in detail.

The present inventors found that coating of a surface of an intermediate transfer member with a compound having a high ionization potential is important to prevent electrical discharge before or after a contact between a photosensitive member or a recording medium and the intermediate transfer member (hereinafter also referred to as abnormal electrical discharge).

The relationship between ionization potential and abnormal electrical discharge will be described below.

Ionization potential, which is also referred to as ionization energy, means energy required to remove an electron from an atom and ionize the atom. Electrical discharge means electrical conduction through a gas between electrodes due to dielectric breakdown caused by a potential difference between the electrodes. A surface having a high ionization potential is resistant to electron release and abnormal electrical discharge.

One of typical materials having a high ionization potential is a fluorine compound. The group 17 elements of the periodic table, such as fluorine, are resistant to electron release and have very high first ionization energy. Thus, fluorine compounds, such as polytetrafluoroethylene (PTFE) and perfluoropolyethers (PFPEs), have high ionization potential.

However, it was found that repeated transfer can also gradually decrease the ionization potential of a surface of an intermediate transfer member even coated with a compound having a high ionization potential. The ionization potential of a surface of an intermediate transfer member coated with a compound having a high ionization potential may decrease to the ionization potential of a surface of an intermediate transfer member not coated with the compound having a high ionization potential during repeated transfer.

Such a phenomenon is probably caused by the following mechanism.

Transferring toner from a photosensitive member to an intermediate transfer member and from the intermediate transfer member to a paper sheet requires a high voltage. An intermediate transfer member is sometimes cleaned with a cleaning blade to remove residual toner. Thus, electrical discharge during transferring toner may cause chemical degradation of the compound having a high ionization potential, and cleaning friction may cause the compound having a high ionization potential to be removed from the surface of the intermediate transfer member. As a result, the ionization potential of the surface of the intermediate transfer member decreases during repeated transfer, and abnormal electrical discharge occurs.

The present invention solves these problems using an intermediate transfer member for electrophotography comprising a substrate and a surface layer provided on the substrate. The surface layer comprises a binder resin and a perfluoropolyether. An extraction amount of the perfluoropolyether per 10 $mm^3$ of the surface layer, is 0.10 mg or more and 5.00 mg or less, the extraction amount of the perfluoropolyether obtained by immersing the intermediate transfer member for electrophotography into a solvent of 1,1,2,2,3,3,4-heptafluorocyclopentane and methylethylketone, the mixing ratio in mass being 1:1, at 25 degrees in Celsius for 24 hours. A surface of the intermediate transfer member for electrophotography that is not subjected to the following first and second treatments, has a n-hexadecane contact angle of 55 degrees or more. A surface of the intermediate transfer member for electrophotography that has been subjected to the following first treatment has a n-hexadecane contact angle of 40 degrees or less. A surface of the intermediate transfer member for electrophotography that has been subjected to the following second treatment has a n-hexadecane contact angle of 50 degrees or more.

The present invention will be further described below.

A PFPE is a fluorine compound having a high ionization potential. A PFPE on a surface of an intermediate transfer member can prevent abnormal electrical discharge. However, as described above, repeated transfer tends to cause degradation or removal of a PFPE on a surface of an intermediate transfer member and thereby induce abnormal electrical discharge.

The present invention prevents abnormal electrical discharge by allowing a PFPE in a surface layer to move to a surface of an intermediate transfer member and thereby compensate for degradation or removal of the PFPE on the surface of the intermediate transfer member during repeated transfer.

In an intermediate transfer member for electrophotography according to an embodiment of the present invention, the extraction amount of PFPE per 10 $mm^3$ of the surface layer, is 0.10 mg or more and 5.00 mg or less, the extraction amount of the perfluoropolyether obtained by immersing the intermediate transfer member for electrophotography into a solvent of 1,1,2,2,3,3,4-heptafluorocyclopentane and methylethylketone, the mixing ratio in mass being 1:1, at 25 degrees in Celsius for 24 hours. This requirement means that the surface layer of the intermediate transfer member contains a certain amount of PFPE that can move to the surface of the intermediate transfer member. The extraction amount of PFPE per 10 $mm^3$ of the surface layer is preferably 0.20 mg or more and 4.70 mg or less.

Thus, it is important for an intermediate transfer member for electrophotography according to an embodiment of the present invention to contain a PFPE that can easily move to a surface of the intermediate transfer member in the surface layer. However, a PFPE that can easily move to a surface of the intermediate transfer member cannot be sufficiently introduced into the surface layer only by adding the PFPE to the surface layer.

In the present invention, a PFPE that can easily move to a surface of the intermediate transfer member is introduced into the surface layer of the intermediate transfer member by adding a dispersant for dispersing the PFPE to the surface layer and/or controlling the conditions under which the surface layer is cured.

In an intermediate transfer member for electrophotography according to an embodiment of the present invention, a surface of the intermediate transfer member for electrophotography that is not subjected to the following first and second treatments, has a n-hexadecane contact angle of 55 degrees or more, a surface of the intermediate transfer member for electrophotography that has been subjected to the following first treatment, has a n-hexadecane contact angle of 40 degrees or less, and a surface of the intermediate transfer member for electrophotography that has been subjected to the following second treatment, has a n-hexadecane contact angle of 50 degrees or more.

(I) The first treatment includes the steps of:

(i) cutting a rectangular test piece from the intermediate transfer member for electrophotography;

(ii) wrapping and fixing the rectangular test piece around a peripheral surface of a cylindrical metal core to form a first roller;

(iii) bringing the first roller into contact with a second roller with a load of 2 kgf, the second roller comprising a cylindrical metal core and a surface layer provided thereon containing a carbon black and an acrylonitrile rubber, and having a volume resistivity of $1.0\times10^6 \Omega\cdot cm$; and (iv) rotating the first roller at a circumferential speed of 200 mm/s for 15 hours while a voltage of 6.5 kV is applied between the first roller and the second roller.

(II) The second treatment includes the steps of:

(v) cutting a rectangular test piece from the intermediate transfer member for electrophotography;

(vi) wrapping and fixing the rectangular test piece around a peripheral surface of a cylindrical metal core to form a first roller;

(vii) bringing the first roller into contact with a second roller with a load of 2 kgf, the second roller comprising a cylindrical metal core and a surface layer provided thereon containing a carbon black and an acrylonitrile rubber, and having a volume resistivity of $1.0\times10^{6}\Omega\cdot$cm;

(viii) rotating the first roller at a circumferential speed of 200 mm/s for 15 hours while a voltage of 6.5 kV is applied between the first roller and the second roller; and (ix) heating the first roller resulting from the step (viii) at 70 degrees in Celsius for 2 hours.

This requirement means that even when the amount of fluorine on the surface of the intermediate transfer member for electrophotography decreases, the amount of fluorine increases thereafter.

As a result of studies, the present inventors found that the amount of fluorine on the surface of the intermediate transfer member as measured by X-ray photoelectron spectroscopy (XPS) has a positive correlation with the n-hexadecane (hereinafter also referred to as n-HD) contact angle of the surface of the intermediate transfer member. Thus, the present invention defines the amount of fluorine on the surface of the intermediate transfer member using the n-HD contact angle.

The requirement that a surface of the intermediate transfer member for electrophotography that is not subjected to the first and second treatments, has a n-HD contact angle of 55 degrees or more means that the surface of the intermediate transfer member contains a certain amount of fluorine.

The requirement that a surface of the intermediate transfer member for electrophotography that has been subjected to the first treatment, has a n-HD contact angle of 40 degrees or less means that the surface of the intermediate transfer member subjected to the first treatment contains a small amount of fluorine. This provides a standard for judging whether the intentionally decreased amount of fluorine on the surface of the intermediate transfer member subjected to the first treatment is increased by a treatment after the first treatment.

The requirement that a surface of the intermediate transfer member for electrophotography that has been subjected to the second treatment, has a n-HD contact angle of 50 degrees or more means that the surface of the intermediate transfer member subjected to the second treatment contains a certain amount of fluorine. In the second treatment after the first treatment, the test-piece-fixed roller (first roller) to which the test piece of the intermediate transfer member is fixed is heated at 70 degrees in Celsius for two hours. This heat treatment allows a PFPE that can easily move to a surface of the intermediate transfer member contained in the surface layer of the intermediate transfer member if present at all to move to the surface of the intermediate transfer member.

As described above, an intermediate transfer member for electrophotography that satisfies the requirements regarding the n-HD contact angle includes a surface layer that contains a certain amount of PFPE that can move to a surface of the intermediate transfer member in response to a decrease in the amount of fluorine on the surface of the intermediate transfer member. This can further prevent image degradation due to abnormal electrical discharge during repeated transfer.

[Structure of Intermediate Transfer Member for Electrophotography]

An intermediate transfer member for electrophotography according to an embodiment of the present invention may be in the form of a belt, a roller, or the like and may be used in any suitable form.

An intermediate transfer member for electrophotography in the form of a belt will be described below.

<Substrate>

A substrate of an intermediate transfer member for electrophotography according to an embodiment of the present invention is preferably a semiconductive film formed of a resin containing an electrically conductive agent.

The resin may be a thermosetting resin or a thermoplastic resin. From the point of the view of high strength and high durability, the substrate preferably contains a polyimide, a polyamideimide, a polyetheretherketone, a polyphenylene sulfide, or a polyester. More preferably, the substrate contains a polyimide, a polyamideimide, or a polyetheretherketone.

The resin may be a single resin or a blend or alloy of a plurality of resins and is appropriately selected according to desired characteristics, such as mechanical strength.

The electrically conductive agent may be an electron-conducting substance or an ion-conducting substance.

Examples of the electron-conducting substance include, but are not limited to, carbon black, antimony-doped tin oxide, titanium oxide, and electrically conductive polymers.

Examples of the ion-conducting substance include, but are not limited to, sodium perchlorate, lithium, cationic or anionic surfactants, nonionic surfactants, and oligomers and polymers having oxyalkylene repeating units.

The substrate preferably has a volume resistivity of $1.0\times10^{7}\Omega\cdot$cm or more and $1.0\times10^{12}\Omega\cdot$cm or less. The substrate preferably has a surface resistivity of $1.0\times10^{8}$ ohms per square or more and $1.0\times10^{14}$ ohms per square or less.

The substrate having a volume resistivity in this range can further reduce image defects due to charge-up or an insufficient transfer bias during continuous operation.

The substrate having a surface resistivity in this range can further reduce separating discharge due to separation of a transfer material S from an intermediate transfer belt 7 or image defects due to toner scattering.

The intermediate transfer member for electrophotography after a surface layer is formed on the substrate preferably has substantially the same volume resistivity and surface resistivity.

Thus, the surface layer of the intermediate transfer member for electrophotography also is preferably semiconductive. More specifically, the intermediate transfer member for electrophotography preferably has a volume resistivity of $1.0\times10^{7}\Omega\cdot$cm or more and $1.0\times10^{12}\Omega\cdot$cm or less. The intermediate transfer member for electrophotography preferably has a surface resistivity of $1.0\times10^{8}$ ohms per square or more and $1.0\times10^{14}$ ohms per square or less.

The surface layer preferably contains an electrically conductive agent so as to adjust the volume resistivity and/or the surface resistivity of the intermediate transfer member for electrophotography. The electrically conductive agent for use in the surface layer can be the electrically conductive agent for use in the substrate.

The substrate preferably has a thickness of 30 μm or more and 150 μm or less.

<Surface Layer>

The surface layer of the intermediate transfer member for electrophotography will be described below.

{Binder Resin}

A binder resin in the surface layer is used to disperse a PFPE, provide adhesion with the substrate, and improve mechanical strength.

Examples of the binder resin include, but are not limited to, styrene resin, acrylic resin, methacrylate resin, epoxy resin, polyester resin, polyether resin, silicone resin, poly (vinyl butyral) resin, and mixtures thereof.

In particular, the binder resin is preferably a methacrylate resin or acrylic resin (hereinafter collectively referred to as an acrylic resin).

More specifically, a polymerizable monomer of an acrylic resin, a solvent, a perfluoropolyether, and a dispersant are uniformly mixed in a wet dispersing apparatus to prepare a dispersion liquid. The dispersion liquid is applied to the substrate using a coating method, such as bar coating or spray coating. The dispersion liquid on the substrate is then dried to remove the solvent. The polymerizable monomer is then polymerized using heat, an electron beam, or ultraviolet light to form a surface layer.

A polymerization initiator may be used for the polymerization.

Examples of the polymerization initiator include, but are not limited to, radical polymerization initiators, such as alkylphenones and acylphosphine oxide, cationic polymerization initiators, such as aromatic sulfonium salts, and a nifedipine anionic polymerization initiator. More specifically, examples of the radical polymerization initiators include, but are not limited to, Irgacure series (manufactured by BASF), and examples of the cationic polymerization initiators include, but are not limited to, SP series (manufactured by Adeka Corp.).

Known additive agents, such as the electrically conductive agent, an antioxidant, a leveling agent, a crosslinking agent, and a flame retardant may also be used. Solid filler may be used to increase strength.

The content of the binder resin is preferably 20.0 mass % or more and 95.0 mass % or less, more preferably 30.0 mass % or more and 90.0 mass % or less, based on the mass of the total solid component in the surface layer.

The thickness of the surface layer can be appropriately controlled by changing the film-forming conditions (such as the solid content and the film-forming rate). The thickness of the surface layer is preferably 1 μm or more in consideration of wear and tear under real apparatus durability conditions and 20 μm or less in consideration of flexibility of a stretched belt, more preferably 10 μm or less.

The acrylic resin is preferably a polymer having a repeating structural unit produced by polymerization of any of the following polymerizable monomers (i) and (ii):

(i) at least one acrylate selected from the group consisting of pentaerythritol triacrylate, pentaerythritol tetraacrylate, ditrimethylolpropane tetraacrylate, dipentaerythritol hexaacrylate, alkyl acrylates, benzyl acrylate, phenyl acrylate, ethylene glycol diacrylate, and bisphenol A diacrylate, and (ii) at least one methacrylate selected from the group consisting of pentaerythritol trimethacrylate, pentaerythritol tetramethacrylate, ditrimethylolpropane tetramethacrylate, dipentaerythritol hexamethacrylate, alkyl methacrylates, benzyl methacrylate, phenyl methacrylate, ethylene glycol dimethacrylate, and bisphenol A methacrylate.

The binder resin is preferably hard so as to reduce toner deposition. Thus, the acrylic resin can have high hardness by using a large amount of bifunctional or higher functional cross-linking monomer. More specifically, the average number of acrylic functional groups of the polymerizable monomer is preferably 2 or more, more preferably 3 or more, still more preferably 4 or more. A highly crosslinked hard resin is generally a thermosetting resin. Thus, thermosetting resins, including acrylic resins, can be used in the present invention.

The physical properties of the binder resin of the surface layer will be described below.

The binder resin of the surface layer is preferably solid. The glass transition temperature of the binder resin is preferably equal to or higher than the operating temperature, substantially 40 degrees in Celsius or more, more preferably 50 degrees in Celsius or more.

{Perfluoropolyether (PFPE)}

A PFPE, as used herein, refers to an oligomer or polymer having a repeating structural unit of a perfluoroalkylene ether. The repeating structural unit of the perfluoroalkylene ether may be perfluoromethylene ether, perfluoroethylene ether, or perfluoropropylene ether. More specifically, the PFPE may be Demnum manufactured by Daikin Industries, Ltd., Krytox manufactured by Du Pont, or Fomblin manufactured by Solvay Solexis. The perfluoropolyether preferably has a repeating structural unit 1 represented by the following formula (a) or a repeating structural unit 2 represented by the following formula (b).

[Chem. 1]

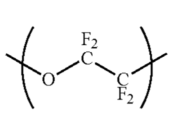

(a)

[Chem. 2]

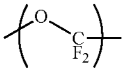

(b)

In the case that the PFPE has the repeating structural unit 1 or the repeating structural unit 2, the number of repetitions p of the repeating structural unit 1 and the number of repetitions q of the repeating structural unit 2 independently satisfy $0 \leq p \leq 100$ and $0 \leq q \leq 100$, and p+q can be 1 or more.

In the case that the PFPE has both the repeating structural unit 1 and the repeating structural unit 2, the repeating structural unit 1 and the repeating structural unit 2 may form a block copolymer structure or a random copolymer structure.

The PFPE preferably has a weight-average molecular weight Mw of 100 or more and 9,000 or less, more preferably 100 or more and 8,000 or less, so as to be movable to a surface of the intermediate transfer member.

The PFPE may have a reactive functional group that can form a bond or a structure close to a bond with the binder resin of the surface layer of the intermediate transfer member for electrophotography or a nonreactive functional group that cannot form a bond or a structure close to a bond with the binder resin of the surface layer.

In the case that the binder resin is formed by an addition reaction, a reactive functional group that can cause the addition reaction with a monomer of the binder resin may be an acryl group, a methacryl group, or an oxiranyl group.

Examples of the PFPE having such a reactive functional group include, but are not limited to, Fluorolink MD500, MD700, MD40, 5101X, 5113X, and AD1700, which have an acryl group or a methacryl group, manufactured by Solvay Solexis, Optool DAC manufactured by Daikin Industries, Ltd., and Fluorolink S10, which has a silane group.

In the case that the binder resin is formed by an addition reaction, a nonreactive functional group that cannot cause the addition reaction with a monomer of the binder resin may be a hydroxy group, a trifluoromethyl group, or a methyl group. Examples of the PFPE having such a nonreactive functional group include, but are not limited to, Fluorolink D10H, D4000, and Fomblin Z15 manufactured by Solvay Solexis and Demnum S-20, S-65, and S-200 manufactured by Daikin Industries, Ltd.

PFPEs preferably have a nonreactive functional group from the point of the view of easily moving to a surface of the intermediate transfer member.

The content of the PFPE is preferably 10.0 mass % or more and 70.0 mass % or less, more preferably 10.0 mass % or more and 60.0 mass % or less, still more preferably 20.0 mass % or more and 50.0 mass % or less, based on the mass of the total solid component in the surface layer. When the content of the PFPE is in these ranges, the PFPE in the surface layer of the intermediate transfer member can move to the surface of the intermediate transfer member during repeated transfer and compensate for a decrease in the amount of PFPE on the surface of the intermediate transfer member.

In order to adjust the extraction amount of PFPE per 10 $mm^3$ of a surface layer of an intermediate transfer member according to an embodiment of the present invention in the range of 0.10 mg or more and 5.00 mg or less, the PFPE in the surface layer preferably forms as few chemical bonds with the binder resin as possible. Thus, as described above, the PFPE can have little or no reactive functional group that can form a bond or a structure close to a bond with the binder resin. In the case that the PFPE has a reactive functional group, the manufacturing conditions for the intermediate transfer member for electrophotography can be controlled such that the reactive functional group does not cause a chemical reaction with the binder resin.

{Dispersant}

The surface layer of the intermediate transfer member for electrophotography preferably further comprises a dispersant for dispersing the perfluoropolyether. The dispersant can further stabilize the dispersed state of the PFPE in the surface layer. The dispersant may be a compound including a moiety having an affinity for a perfluoroalkyl chain and a hydrocarbon, that is, an amphiphilic (fluorophilic and fluorophobic) compound, such as a surfactant, an amphiphilic block copolymer, or an amphiphilic graft copolymer. Particular examples of the dispersant include, but are not limited to, at least one of (i) block copolymers produced by the copolymerization of a vinyl monomer having a fluoroalkyl group and an acrylate or methacrylate, and (ii) comb-shaped graft copolymers produced by the copolymerization of an acrylate having a fluoroalkyl group or methacrylate having a fluoroalkyl group with a methacrylate macromonomer having a polymethyl methacrylate as a side chain.

Examples of the block copolymers (i) include, but are not limited to, Modiper (trade name) F200, F210, F2020, F600, and FT-600 manufactured by NOF Corp. Examples of the comb-shaped graft copolymers (ii) include, but are not limited to, fluorinated graft polymers, such as Aron GF-150, GF-300, and GF-400 manufactured by Toagosei Co., Ltd.

The dispersant content is preferably 1.0 mass % or more and 70.0 mass % or less, more preferably 5.0 mass % or more and 60.0 mass % or less, based on the mass of the total solid component in the surface layer.

The type and amount of dispersant can also be important factors for adjusting the extraction amount of PFPE in the range of 0.10 mg or more and 5.00 mg or less per 10 $mm^3$ of the surface layer of the intermediate transfer member.

[Method for Manufacturing Intermediate Transfer Member for Electrophotography]

A specific method for manufacturing an intermediate transfer member for electrophotography according to an embodiment of the present invention will be described below. The present invention is not limited to this manufacturing method.

{Substrate}

A substrate of the intermediate transfer member for electrophotography can be manufactured using the following method.

When a thermosetting resin is used, an electrically conductive agent, such as carbon black, a thermosetting resin precursor or a soluble thermosetting resin, and a solvent are mixed to prepare a varnish. The varnish is applied to a forming die of a centrifugal molding machine and is baked in a baking process to form a semiconductive film.

When a thermoplastic resin is used, an electrically conductive agent, such as carbon black, a thermoplastic resin, and an optional additive agent are melt-kneaded, for example, in a twin-screw kneader to produce a semiconductive resin composition. The resin composition is then melt-extruded to form a semiconductive sheet, film, or seamless belt. The seamless belt may be formed using a cylindrical die or by joining extruded sheets together. A substrate may also be formed by heat pressing or injection molding.

The intermediate transfer member for electrophotography can be subjected to crystallization treatment to increase the mechanical strength and the endurance strength thereof. The crystallization treatment may be annealing performed at a temperature equal to or higher than the glass transition temperature (Tg) of the resin and can promote crystallization of the resin. The intermediate transfer member for electrophotography thus manufactured has high mechanical strength and endurance strength as well as high abrasion resistance, chemical resistance, slidability, tenacity, and flame retardancy.

High mechanical strength of an intermediate transfer member for electrophotography according to an embodiment of the present invention can be confirmed in a tensile test according to JIS K 7113. More specifically, the intermediate transfer member for electrophotography preferably has a tensile modulus of 1.5 GPa or more, more preferably 2.0 GPa or more, still more preferably 2.5 GPa or more. The elongation at break of the intermediate transfer member for electrophotography is preferably 10% or more, more preferably 20% or more. The intermediate transfer member for electrophotography also has high bending fatigue strength in a bending fatigue test according to JIS P 8115.

{Surface Layer}

A surface layer of the intermediate transfer member for electrophotography can be formed using the following method.

The surface layer is preferably formed by the steps of:

(1) mixing a perfluoropolyether, a polymerizable monomer forming a binder resin, a dispersant, and a polymerization initiator to form a mixture;

(2) applying the mixture to a substrate; and (3) polymerizing the polymerizable monomer by irradiating the mixture with ultraviolet light.

In the mixing step, a perfluoropolyether, a polymerizable monomer used to form a binder resin, a dispersant, and a polymerization initiator are mixed in an agitation-type homogenizer and an ultrasonic homogenizer to form a mixture. A solvent, an ultraviolet curing agent, an electrically conductive agent, and an additive agent may be added to the mixture. The solvent may be MEK, MIBK, and/or ethylene glycol. The ultraviolet curing agent may be a photopolymerization initiator or a thermal polymerization initiator. The additive agent may be filler particles, a colorant, and/or a leveling agent.

In the applying step, the mixture is applied to a substrate using bar coating or spray coating. The mixture is dried at a temperature in the range of 60 to 90 degrees in Celsius to remove the solvent.

In the polymerization step, the mixture on the substrate is irradiated with ultraviolet light using an ultraviolet irradiation apparatus to polymerize the polymerizable monomer in the mixture. An intermediate transfer member for electrophotography according to an embodiment of the present invention can be manufactured by these steps. A belt may be coated using a ring coating method.

[Electrophotographic Apparatus]

An electrophotographic apparatus including an intermediate transfer member for electrophotography according to an embodiment of the present invention will be described below with reference to the FIGURE.

An electrophotographic apparatus 100 in the FIGURE is an electrophotographic color-image forming apparatus (color laser printer).

The image-forming apparatus 100 includes image-forming units Py, Pm, Pc, and Pk along an intermediate transfer belt 7, which is an intermediate transfer member, in this order in the direction of movement of the intermediate transfer belt 7. The image-forming units are image-forming portions of yellow (Y), magenta (M), cyan (C), and black (K) color components. Since the image-forming units have the same basic structure, only the yellow image-forming unit Py will be described in detail below.

The yellow image-forming unit Py includes a drum-type electrophotographic photosensitive member (hereinafter referred to as a photosensitive drum) 1Y as an image bearing member. The photosensitive drum 1Y includes a charge-generating layer, a charge-transport layer, and a surface protective layer in this order on an aluminum cylindrical substrate.

The yellow image-forming unit Py includes a charging roller 2Y. The surface of the photosensitive drum 1Y is uniformly charged by applying a charging bias to the charging roller 2Y.

A laser exposure apparatus 3Y is disposed above the photosensitive drum 1Y as an image exposure unit. The surface of the uniformly charged photosensitive drum 1Y is exposed to light emitted from the laser exposure apparatus 3Y in response to the image information. An electrostatic latent image of the yellow color component is formed on the surface of the uniformly charged photosensitive drum 1Y.

The electrostatic latent image on the photosensitive drum 1Y is developed with a developer toner in a developing unit 4Y. The developing unit 4Y includes a developing roller 4Ya as a developer carrier and a regulating blade 4Yb as a member for regulating the amount of developer and contains a yellow toner as a developer. The developing roller 4Ya supplied with the yellow toner is lightly pressed against the photosensitive drum 1Y in a developing portion and is rotated in the same direction as the photosensitive drum 1Y at a different speed from the photosensitive drum 1Y. When a developing bias is applied to the developing roller 4Ya, the yellow toner supplied to the developing portion by the developing roller 4Ya is deposited on the electrostatic latent image formed on the photosensitive drum 1Y. As a result, a visible image (yellow toner image) is formed on the photosensitive drum 1Y.

The intermediate transfer belt 7, which is an intermediate transfer member, is tightly stretched around a driving roller 71, a tension roller 72, and a driven roller 73 and is moved (rotated) in contact with the photosensitive drum 1Y in the direction of the arrow indicated in the FIGURE. When reaching a first transfer portion Ty, the yellow toner image is transferred to the intermediate transfer belt 7 using a first transfer roller 5Y, which is a first transfer member and is pressed against the photosensitive drum 1Y with the intermediate transfer belt 7 interposed therebetween.

This image-forming operation is performed in the magenta (M), cyan (C), and black (K) units Pm, Pc, and Pk as the intermediate transfer belt 7 travels, thereby forming four color toner images of yellow, magenta, cyan, and black stacked on the intermediate transfer belt 7. The four color toner layers are conveyed with the intermediate transfer belt 7 and are simultaneously transferred to a transfer material S at a second transfer portion T' using a second transfer roller 8. The transfer material S is conveyed at a predetermined timing. A transfer voltage of several kilovolts is applied to achieve a sufficient transfer ratio in the second transfer. This sometimes causes electrical discharge in the vicinity of a transfer nip. The electrical discharge is responsible for the chemical degradation of the transfer member (intermediate transfer belt).

The transfer material S is stored in a cassette 12, which is a transfer material storage. The transfer material S is picked up with a pickup roller 13 and is conveyed to the second transfer portion T' using a conveying roller pair 14 and a registration roller pair 15 in synchronism with the conveyance of the four color toner images transferred to the intermediate transfer belt 7.

The toner image transferred to the transfer material S is fixed in a fixing unit 9 to form a full-color image, for example. The fixing unit 9 includes a fixing roller 91 having a heater and a pressure roller 92 and fixes an unfixed toner image on the transfer material S by heat pressing.

The transfer material S is then ejected from the apparatus by a conveying roller pair 16 and an ejection roller pair 17.

A cleaning blade 11 for cleaning the intermediate transfer belt 7 is disposed downstream of the second transfer portion T' in the driving direction of the intermediate transfer belt 7 and removes residual toner from the intermediate transfer belt 7 that is not transferred to the transfer material S at the second transfer portion T'.

As described above, a process of electrically transferring a toner image from a photosensitive member to an intermediate transfer belt and from the intermediate transfer belt to a recording medium is repeatedly performed. The electrical transfer process is also repeatedly performed for printing on many transfer media.

The electrophotographic apparatus performs the image-forming operation in the yellow (Y), magenta (M), cyan (C), and black (K) units Py, Pm, Pc, and Pk as the intermediate transfer belt 7 travels, thereby forming four color toner images of yellow, magenta, cyan, and black stacked on the intermediate transfer belt 7. The four color toner layers are conveyed with the intermediate transfer belt 7 and are simultaneously transferred to a transfer material S at a second transfer portion T' using a second transfer roller 8. The transfer material S is conveyed at a predetermined timing.

The present invention provides an intermediate transfer member for electrophotography that can prevent image defects due to electrical discharge during repeated transfer and produce high-quality images for a long time. The present invention also provides an electrophotographic apparatus including the intermediate transfer member for electrophotography.

EXAMPLES

Although the present invention will be further described in the following examples and comparative examples, the present invention is not limited to these examples.

[Measurement Method]

The physical properties (the extraction amount of PFPE, the weight-average molecular weight of extracted PFPE, and the n-hexadecane contact angle) of intermediate transfer belts 1 to 14 manufactured in Examples 1 to 10 and Comparative Examples 1 to 4 were measured using the following methods.

<Extraction Amount of PFPE and Weight-Average Molecular Weight of Extracted PFPE>

The extraction amount of PFPE and the weight-average molecular weight of extracted PFPE of an intermediate transfer member for electrophotography were measured using the following method.

An intermediate transfer member having a length of 50 mm, a width of 50 mm, and a surface layer thickness of 4 μm was immersed in 100 ml of a solvent that could solve a PFPE (Zeorora H (manufactured by Zeon Corp.):methylethylketone=1:1 (based on mass)) at 25 degrees in Celsius for 24 hours. The solvent was then removed with an evaporator. The extraction amount of PFPE was calculated from the amount of residual substance. The compound name of Zeorora H is 1,1,2,2,3,3,4-heptafluorocyclopentane.

The residual substance was subjected to a liquid chromatography system (manufactured by Shimadzu Corp.) to measure the weight-average molecular weight Mw of extracted PFPE.

<n-Hexadecane Contact Angle>

The n-hexadecane (n-HD) contact angle of the surface of the intermediate transfer member for electrophotography that was not subjected to the first and second treatments and the intermediate transfer member for electrophotography after the first treatment and after the second treatment was measured with a contact angle meter (trade name: CA-W, manufactured by Kyowa Interface Science Co., Ltd.). The initial n-HD contact angle in Table 2 refers to the n-HD contact angle of the intermediate transfer member for electrophotography that was not subjected to the first treatment or the second treatment.

In the first and second treatments, first, a rectangular test piece was cut from the intermediate transfer member for electrophotography. The rectangular test piece was wrapped and fixed around a cylindrical SUS metal core to prepare a test-piece-fixed roller (first roller).

The test-piece-fixed roller was pressed against an electrically conductive rubber roller (second roller) with a load of 2 kgf. In the first treatment, while a voltage of 6.5 kV was applied between the test-piece-fixed roller and the electrically conductive rubber roller, the test-piece-fixed roller was rotated at a circumferential speed of 200 mm/s for 15 hours. In the second treatment after the first treatment, the test-piece-fixed roller was heated at 70 degrees in Celsius for two hours.

The electrically conductive rubber roller was prepared by forming an acrylonitrile rubber surface layer on the peripheral surface of a cylindrical SUS metal core. The acrylonitrile rubber surface layer contained carbon black, which imparted electroconductivity to the surface layer. The electrically conductive rubber roller had a volume resistivity of $1.0\times10^6\Omega\cdot$cm.

[Image Evaluation]

Images obtained with the intermediate transfer belts 1 to 14 manufactured in Examples 1 to 10 and Comparative Examples 1 to 4 were evaluated using the following methods.

<Evaluation of Transferability>

A polyimide intermediate transfer belt of iRC2620 manufactured by CANON KABUSHIKI KAISHA was replaced with each of the intermediate transfer belts 1 to 14. Printing was performed with the iRC2620. Images printed immediately after the start of printing and after printing of 10,000 sheets (after 10,000 times of repeated transfer) were evaluated.

Image evaluation criteria were as follows:

A: No decrease in image quality due to poor transfer.

B: Little decrease in image quality due to poor transfer.

C: Low image quality in 50% or less of the print area due to poor transfer.

D: Low image quality over the entire print area due to poor transfer.

<Evaluation of Toner Scattering>

An unfixed image was outputted at the point in time when a fine-line image (7 lines/mm) was transferred to a paper sheet. The unfixed image was fixed in an oven at 100 degrees in Celsius under no pressure. The resulting image was checked for toner scattering in the fine-line image with a magnifier.

A: No toner scattering in the fine-line image.

B: Toner scattering in 1 or 2 lines in the fine-line image.

C: Toner scattering in 3 or 4 lines in the fine-line image.

D: Toner scattering in 5 or more lines in the fine-line image.

Example 1

A polyimide intermediate transfer belt of an electrophotographic apparatus (iRC2620 manufactured by CANON KABUSHIKI KAISHA) was used as a substrate. A surface layer was formed on the substrate using the following method. Thus, an intermediate transfer belt was manufactured.

| | |
|---|---|
| Dipentaerythritol hexaacrylate | 8.0 parts by mass |
| Pentaerythritol tetraacrylate | 17.0 parts by mass |
| Pentaerythritol triacrylate | 5.0 parts by mass |
| Methyl ethyl ketone | 43.0 parts by mass |
| Ethylene glycol | 15.0 parts by mass |
| Antimony-doped tin oxide fine particles (SN-100P manufactured by Ishihara Sangyo Kaisha, Ltd.) | 4.0 parts by mass |
| Photopolymerization initiator (Irgacure 184 manufactured by BASF) | 2.0 parts by mass |
| Dispersant (GF-300 (solid content: 25 mass %) manufactured by Toagosei Co., Ltd.) | 63.0 parts by mass |
| PFPE (MD700 (weight-average molecular weight: 1,700) manufactured by Solvay Solexis) | 21.0 parts by mass |

These materials were mixed in an agitation-type homogenizer (manufactured by As One Corp.) and then in a dispersing apparatus Nanomizer (manufactured by Yoshida Kikai Co., Ltd.) to produce a mixed dispersion liquid. The mixed dispersion liquid was applied to the polyimide intermediate transfer belt of the electrophotographic apparatus (iRC2620 manufactured by CANON KABUSHIKI KAISHA) and was dried at 70 degrees in Celsius for 3 minutes. The monomers were polymerized by ultraviolet irradiation at an integrated amount of light of 500 mJ/cm$^2$ using a high-pressure mercury lamp (manufactured by Ushio Inc., output: 160 W), thereby forming a surface layer having a thickness of 4 μm on an intermediate transfer belt 1. Table 1 shows the type and amount of the PFPE and the type and amount of the dispersant. Table 2 shows the physical properties of the intermediate transfer belt 1. Table 3 shows the evaluation results.

Example 2

An intermediate transfer belt 2 was manufactured in the same manner as in Example 1 except that the amount of PFPE (MD700 manufactured by Solvay Solexis) was 7.0 parts by mass, and the amount of dispersant (GF-300 manufactured by Toagosei Co., Ltd.) was 21.0 parts by mass. Table 1 shows the type and amount of the PFPE and the type and amount of the dispersant. Table 2 shows the physical properties of the intermediate transfer belt 2. Table 3 shows the evaluation results.

Example 3

An intermediate transfer belt 3 was manufactured in the same manner as in Example 1 except that the PFPE (MD700 manufactured by Solvay Solexis) was replaced with another PFPE (D10H manufactured by Solvay Solexis). Table 1 shows the type and amount of the PFPE and the type and amount of the dispersant. Table 2 shows the physical properties of the intermediate transfer belt 3. Table 3 shows the evaluation results. The PFPE (D10H manufactured by Solvay Solexis) has a weight-average molecular weight of 1600.

Example 4

An intermediate transfer belt 4 was manufactured in the same manner as in Example 1 except that the PFPE (MD700 manufactured by Solvay Solexis) was replaced with another PFPE (MD40 manufactured by Solvay Solexis). Table 1 shows the type and amount of the PFPE and the type and amount of the dispersant. Table 2 shows the physical properties of the intermediate transfer belt 4. Table 3 shows the evaluation results. The PFPE (MD40 manufactured by Solvay Solexis) has a weight-average molecular weight of 4000.

Example 5

An intermediate transfer belt 5 was manufactured in the same manner as in Example 1 except that the PFPE (MD700 manufactured by Solvay Solexis) was replaced with another PFPE (MD500 manufactured by Solvay Solexis). Table 1 shows the type and amount of the PFPE and the type and amount of the dispersant. Table 2 shows the physical properties of the intermediate transfer belt 5. Table 3 shows the evaluation results. The PFPE (MD500 manufactured by Solvay Solexis) has a weight-average molecular weight of 1700.

Example 6

An intermediate transfer belt 6 was manufactured in the same manner as in Example 1 except that the amount of PFPE (MD700 manufactured by Solvay Solexis) was 14.0 parts by mass, and 7.0 parts by mass of another PFPE (D10H manufactured by Solvay Solexis) was used. Table 1 shows the type and amount of the PFPE and the type and amount of the dispersant. Table 2 shows the physical properties of the intermediate transfer belt 6. Table 3 shows the evaluation results.

Example 7

An intermediate transfer belt 7 was manufactured in the same manner as in Example 6 except that the PFPE (D10H manufactured by Solvay Solexis) was replaced with another PFPE (MD40 manufactured by Solvay Solexis). Table 1 shows the type and amount of the PFPE and the type and amount of the dispersant. Table 2 shows the physical properties of the intermediate transfer belt 7. Table 3 shows the evaluation results.

Example 8

An intermediate transfer belt 8 was manufactured in the same manner as in Example 6 except that the PFPE (MD700 manufactured by Solvay Solexis) was replaced with another PFPE (MD40 manufactured by Solvay Solexis). Table 1 shows the type and amount of the PFPE and the type and amount of the dispersant. Table 2 shows the physical properties of the intermediate transfer belt 8. Table 3 shows the evaluation results.

Example 9

An intermediate transfer belt 9 was manufactured in the same manner as in Example 1 except that the PFPE (MD700 manufactured by Solvay Solexis) was replaced with another PFPE (Z15 manufactured by Solvay Solexis). Table 1 shows the type and amount of the PFPE and the type and amount of the dispersant. Table 2 shows the physical properties of the intermediate transfer belt 9. Table 3 shows the evaluation results. The PFPE (Z15 manufactured by Solvay Solexis) has a weight-average molecular weight of 8000.

Example 10

An intermediate transfer belt 10 was manufactured in the same manner as in Example 3 except that the amount of PFPE (D10H manufactured by Solvay Solexis) was 70.0 parts by mass, and the amount of dispersant (GF-300 manufactured by Toagosei Co., Ltd.) was 140.0 parts by mass. Table 1 shows the type and amount of the PFPE and the type and amount of the dispersant. Table 2 shows the physical properties of the intermediate transfer belt 10. Table 3 shows the evaluation results.

Comparative Example 1

A PFPE (Z15 manufactured by Solvay Solexis) was diluted two-fold with 1,1,1,3,3,3-hexafluoro-2-propanol (HFIP) (Fomblin solvent ZS-100 manufactured by Enimont Japan Ltd.). High-molecular-weight PFPE components were separated from the diluted PFPE using a large-scale preparative HPLC system (manufactured by Shimadzu Corp.). The high-molecular-weight PFPE components had a weight-average molecular of 10,000. The high-molecular-weight PFPE components are hereinafter referred to as PFPE-Mw10,000.

An intermediate transfer belt 11 was manufactured in the same manner as in Example 1 except that the PFPE (MD700 manufactured by Solvay Solexis) was replaced with the PFPE (PFPE-Mw10,000). Table 1 shows the type and amount of the PFPE and the type and amount of the dispersant. Table 2 shows the physical properties of the intermediate transfer belt 11. Table 3 shows the evaluation results.

Comparative Example 2

An intermediate transfer belt 12 was manufactured in the same manner as in Example 1 except that the PFPE (MD700 manufactured by Solvay Solexis) was replaced with another PFPE (5113X manufactured by Solvay Solexis). Table 1 shows the type and amount of the PFPE and the type and amount of the dispersant. Table 2 shows the physical properties of the intermediate transfer belt 12. Table 3 shows the evaluation results. The PFPE (5113X manufactured by Solvay Solexis) has a weight-average molecular weight of 1000.

Comparative Example 3

An intermediate transfer belt 13 was manufactured in the same manner as in Example 1 except that the ultraviolet light was replaced with an electron beam having an accumulated dose of 1,000 kGy. Table 1 shows the type and amount of the PFPE and the type and amount of the dispersant. Table 2 shows the physical properties of the intermediate transfer belt 13. Table 3 shows the evaluation results.

Comparative Example 4

An intermediate transfer belt 14 was manufactured in the same manner as in Example 1 except that the dispersant (GF-300 manufactured by Toagosei Co., Ltd.) was not used, and the amount of the PFPE (MD700 manufactured by Solvay Solexis) was 1.0 part by mass. Table 1 shows the type and amount of the PFPE and the type and amount of the dispersant. Table 2 shows the physical properties of the intermediate transfer belt 14. Table 3 shows the evaluation results.

Comparative Example 5

A mixed dispersion liquid used to form the surface layer was prepared in the same manner as in Example 1 except that the dispersant (GF-300 manufactured by Toagosei Co., Ltd.) was not used. However, the PFPE was not sufficiently dispersed in the mixed dispersion liquid, and an intermediate transfer belt could not be manufactured.

TABLE 1

| | PFPE | | | Dispersant | |
|---|---|---|---|---|---|
| | Type | Weight-average molecular weight | Amount (parts by mass) | Type | Amount (parts by mass) |
| Example 1 | MD700 | 1700 | 21.0 | GF-300 | 63.0 |
| Example 2 | MD700 | 1700 | 7.0 | GF-300 | 21.0 |
| Example 3 | D10H | 1600 | 21.0 | GF-300 | 63.0 |
| Example 4 | MD40 | 4000 | 21.0 | GF-300 | 63.0 |
| Example 5 | MD500 | 1700 | 21.0 | GF-300 | 63.0 |
| Example 6 | MD700 | 1700 | 14.0 | GF-300 | 63.0 |
| | D10H | 1600 | 7.0 | | |
| Example 7 | MD700 | 1700 | 14.0 | GF-300 | 63.0 |
| | MD40 | 4000 | 7.0 | | |
| Example 8 | MD40 | 4000 | 14.0 | GF-300 | 63.0 |
| | D10H | 1600 | 7.0 | | |
| Example 9 | Z15 | 8000 | 21.0 | GF-300 | 63.0 |
| Example 10 | D10H | 1600 | 70.0 | GF-300 | 140.0 |
| Comparative Example 1 | PFPE-Mw 10,000 | 10000 | 21.0 | GF-300 | 63.0 |
| Comparative Example 2 | 5113X | 1000 | 21.0 | GF-300 | 63.0 |
| Comparative Example 3 | MD700 | 1700 | 21.0 | GF-300 | 63.0 |
| Comparative Example 4 | MD700 | 1700 | 1.0 | — | 0 |
| Comparative Example 5 | MD700 | 1700 | 21.0 | — | 0 |

TABLE 2

| | Intermediate transfer belt | Extraction amount of PFPE (mg) | Weight-average molecular weight of extracted PFPE | n-hexadecane contact angle Initial (°) | After first treatment (°) | After second treatment (°) |
|---|---|---|---|---|---|---|
| Example 1 | Intermediate transfer belt 1 | 0.80 | 3500 | 64 | 38 | 61 |
| Example 2 | Intermediate transfer belt 2 | 0.20 | 4000 | 65 | 32 | 59 |
| Example 3 | Intermediate transfer belt 3 | 2.10 | 1600 | 63 | 39 | 63 |
| Example 4 | Intermediate transfer belt 4 | 0.50 | 5500 | 68 | 35 | 59 |
| Example 5 | Intermediate transfer belt 5 | 1.30 | 2000 | 65 | 39 | 57 |
| Example 6 | Intermediate transfer belt 6 | 1.40 | 2000 | 62 | 38 | 60 |
| Example 7 | Intermediate transfer belt 7 | 0.70 | 4200 | 66 | 35 | 57 |
| Example 8 | Intermediate transfer belt 8 | 1.80 | 2500 | 62 | 36 | 59 |
| Example 9 | Intermediate transfer belt 9 | 1.30 | 8000 | 60 | 34 | 55 |
| Example 10 | Intermediate transfer belt 10 | 4.70 | 1600 | 64 | 39 | 65 |

TABLE 2-continued

| | Intermediate transfer belt | Extraction amount of PFPE (mg) | Weight-average molecular weight of extracted PFPE | n-hexadecane contact angle Initial (°) | After first treatment (°) | After second treatment (°) |
|---|---|---|---|---|---|---|
| Comparative Example 1 | Intermediate transfer belt 11 | 1.60 | 10000 | 67 | 33 | 32 |
| Comparative Example 2 | Intermediate transfer belt 12 | 0.02 | 4000 | 65 | 11 | 13 |
| Comparative Example 3 | Intermediate transfer belt 13 | 0.01 | 7000 | 60 | 17 | 18 |
| Comparative Example 4 | Intermediate transfer belt 14 | 0.02 | 3000 | 64 | 20 | 20 |

TABLE 3

| | Intermediate transfer belt | Transferability Initial | Transferability After printing of 10,000 sheets | Toner scattering Initial | Toner scattering After printing of 10,000 sheets |
|---|---|---|---|---|---|
| Example 1 | Intermediate transfer belt 1 | A | A | A | A |
| Example 2 | Intermediate transfer belt 2 | B | B | A | A |
| Example 3 | Intermediate transfer belt 3 | A | A | A | A |
| Example 4 | Intermediate transfer belt 4 | A | B | A | A |
| Example 5 | Intermediate transfer belt 5 | A | A | A | A |
| Example 6 | Intermediate transfer belt 6 | A | A | A | A |
| Example 7 | Intermediate transfer belt 7 | A | B | A | A |
| Example 8 | Intermediate transfer belt 8 | A | A | A | A |
| Example 9 | Intermediate transfer belt 9 | A | B | A | A |
| Example 10 | Intermediate transfer belt 10 | A | A | A | A |
| Comparative Example 1 | Intermediate transfer belt 11 | A | D | A | D |
| Comparative Example 2 | Intermediate transfer belt 12 | B | D | A | D |
| Comparative Example 3 | Intermediate transfer belt 13 | A | D | A | D |
| Comparative Example 4 | Intermediate transfer belt 14 | A | D | A | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-133199 filed Jun. 25, 2013, which is hereby incorporated by reference herein in its entirety.

What is claimed is:

1. An intermediate transfer member for electrophotography, comprising:

a substrate; and a surface layer provided on the substrate, wherein the surface layer comprises a binder resin and a perfluoropolyether, an extraction amount of the perfluoropolyether per 10 $mm^3$ of the surface layer, is 0.10 mg or more and 5.00 mg or less, the extraction amount of the perfluoropolyether obtained by immersing the intermediate transfer member for electrophotography into a solvent of 1,1,2,2,3,3,4-heptafluorocyclopentane and methylethylketone, the mixing ratio in mass being 1:1, at 25 degrees in Celsius for 24 hours, a surface of the intermediate transfer member for electrophotography that is not subjected to the following first and second treatments, has a n-hexadecane contact angle of 55 degrees or more, a surface of the intermediate transfer member for electrophotography that has been subjected to the following first treatment, has a n-hexadecane contact angle of 40 degrees or less, and a surface of the intermediate transfer member for electrophotography that has been subjected to the following second treatment, has a n-hexadecane contact angle of 50 degrees or more, (I) the first treatment comprising the steps of:

(i) cutting a rectangular test piece from the intermediate transfer member for electrophotography;

(ii) wrapping and fixing the rectangular test piece around a peripheral surface of a cylindrical metal core to form a first roller;

(iii) bringing the first roller into contact with a second roller with a load of 2 kgf, the second roller comprising a cylindrical metal core and a surface layer provided thereon containing a carbon black and an acrylonitrile rubber, and having a volume resistivity of $1.0\times 10^6 \Omega\cdot cm$; and (iv) rotating the first roller at a circumferential speed of 200 mm/s for 15 hours while a voltage of 6.5 kV is applied between the first roller and the second roller, (II) the second treatment comprising the steps of:

(v) cutting a rectangular test piece from the intermediate transfer member for electrophotography;

(vi) wrapping and fixing the rectangular test piece around a peripheral surface of a cylindrical metal core to form a first roller;

(vii) bringing the first roller into contact with a second roller with a load of 2 kgf, the second roller comprising a cylindrical metal core and a surface layer provided thereon containing a carbon black and an acrylonitrile rubber, and having a volume resistivity of $1.0\times 10^6 \Omega\cdot cm$;

(viii) rotating the first roller at a circumferential speed of 200 mm/s for 15 hours while a voltage of 6.5 kV is applied between the first roller and the second roller; and (ix) heating the first roller resulting from the step (viii) at 70 degrees in Celsius for 2 hours, the content of the perfluoropolyether is 10.0 mass % or more and 70.0 mass % or less based on the mass of the total solid component in the surface layer, and the perfluoropolyether has a hydroxy group, a trifluoromethyl group, or a methyl group.

2. The intermediate transfer member for electrophotography according to claim 1, wherein the perfluoropolyether has a weight-average molecular weight Mw of 100 or more and 9,000 or less.

3. The intermediate transfer member for electrophotography according to claim 1, wherein the surface layer further comprises a dispersant for dispersing the perfluoropolyether.

4. The intermediate transfer member for electrophotography according to claim 1, wherein the perfluoropolyether has a repeating structural unit 1 represented by the following formula (a) or a repeating structural unit 2 represented by the following formula (b):

[Chem. 1]

(a)

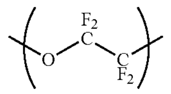

[Chem. 2]

(b)

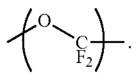

5. The intermediate transfer member for electrophotography according to claim 1, wherein the extraction amount of the perfluoropolyether per 10 $mm^3$ of the surface layer is 0.20 mg or more and 4.70 mg or less.

6. The intermediate transfer member for electrophotography according to claim 1, wherein the binder resin is an acrylic resin.

7. The intermediate transfer member for electrophotography according to claim 6, wherein the acrylic resin is a polymer having a repeating structural unit produced by polymerization of any of the following polymerizable monomers (i) and (ii):

(i) at least one acrylate selected from the group consisting of pentaerythritol triacrylate, pentaerythritol tetraacrylate, ditrimethylolpropane tetraacrylate, dipentaerythritol hexaacrylate, alkyl acrylates, benzyl acrylate, phenyl acrylate, ethylene glycol diacrylate, and bisphenol A diacrylate, and (ii) at least one methacrylate selected from the group consisting of pentaerythritol tri methacrylate, pentaerythritol tetramethacrylate, ditrimethylolpropane tetramethacrylate, dipentaerythritol hexamethacrylate, alkyl methacrylates, benzyl methacrylate, phenyl methacrylate, ethylene glycol dimethacrylate, and bisphenol A methacrylate.

8. The intermediate transfer member for electrophotography according to claim 1, wherein the surface layer is formed by the following steps (1) to (3):

(1) mixing the perfluoropolyether, a polymerizable monomer forming the binder resin, a dispersant, and a polymerization initiator to form a mixture;

(2) applying the mixture to the substrate; and (3) polymerizing the polymerizable monomer by irradiating the mixture with ultraviolet light.

9. The intermediate transfer member for electrophotography according to claim 1, wherein the substrate contains a polyimide, a polyamideimide, a polyetheretherketone, a polyphenylene sulfide, or a polyester.

10. An electrophotographic apparatus, comprising the intermediate transfer member for electrophotography according to claim 1.

* * * * *